(12) United States Patent
Takahagi et al.

(10) Patent No.: US 12,109,677 B2
(45) Date of Patent: Oct. 8, 2024

(54) DRIVER DRILL

(71) Applicant: MAKITA CORPORATION, Anjo (JP)

(72) Inventors: Koji Takahagi, Anjo (JP); Yuta Araki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 102 days.

(21) Appl. No.: 17/845,572

(22) Filed: Jun. 21, 2022

(65) Prior Publication Data

US 2023/0043839 A1    Feb. 9, 2023

(30) Foreign Application Priority Data

Aug. 6, 2021    (JP) .................. 2021-129435

(51) Int. Cl.
| | | |
|---|---|---|
| *B25F 5/02* | (2006.01) | |
| *B25B 21/00* | (2006.01) | |
| *B25F 5/00* | (2006.01) | |
| *H02K 7/14* | (2006.01) | |

(52) U.S. Cl.
CPC .............. *B25F 5/02* (2013.01); *B25B 21/00* (2013.01); *B25F 5/001* (2013.01); *H02K 7/145* (2013.01)

(58) Field of Classification Search
CPC ........................................................ B25F 5/02
See application file for complete search history.

(56) References Cited

U.S. PATENT DOCUMENTS

| | | | |
|---|---|---|---|
| 2018/0099392 A1* | 4/2018 | Sunabe | B25D 17/043 |
| 2018/0222022 A1* | 8/2018 | Kumagai | B25D 11/104 |
| 2020/0223038 A1* | 7/2020 | Araki | B25B 21/023 |
| 2021/0078146 A1 | 3/2021 | Araki et al. | |

FOREIGN PATENT DOCUMENTS

JP    2021-045844 A    3/2021

* cited by examiner

*Primary Examiner* — Daniel Jeremy Leeds
(74) *Attorney, Agent, or Firm* — Oliff PLC

(57) ABSTRACT

A driver drill allows smooth change of the drive conditions of a motor. The driver drill includes a motor, an output unit located frontward from the motor and rotatable with a rotational force from the motor, a trigger lever operable to activate the motor, a forward-reverse switch lever operable to change a rotation direction of the motor, a first operation member operable to change a drive condition of the motor, a second operation member located upward from the first operation member and operable to change the drive condition of the motor, and a controller that sets the drive condition of the motor in response to an operation on at least one of the first operation member or the second operation member.

10 Claims, 11 Drawing Sheets

DRIVER DRILL

CROSS-REFERENCE TO RELATED APPLICATIONS

This application claims the benefit of priority to Japanese Patent Application No. 2021-129435, filed on Aug. 6, 2021, the entire contents of which are hereby incorporated by reference.

BACKGROUND

1. Technical Field

The present disclosure relates to a driver drill.

2. Description of the Background

In the field of driver drills, a known driver drill is described in Japanese Unexamined Patent Application Publication No. 2021-045844.

BRIEF SUMMARY

To change the drive conditions of a motor included in a driver drill, an operator may intend to change the drive conditions of the motor smoothly while remaining in a working posture for using the driver drill.

One or more aspects of the present disclosure are directed to a driver drill that allows smooth change of the drive conditions of a motor.

A first aspect of the present disclosure provides a driver drill, including:
 a motor;
 an output unit located frontward from the motor and rotatable with a rotational force from the motor;
 a trigger lever operable to activate the motor;
 a forward-reverse switch lever operable to change a rotation direction of the motor;
 a first operation member operable to change a drive condition of the motor;
 a second operation member located upward from the first operation member, the second operation member being operable to change the drive condition of the motor; and
 a controller configured to set the drive condition of the motor in response to an operation on at least one of the first operation member or the second operation member.

A second aspect of the present disclosure provides a driver drill, including:
 a motor;
 an output unit located frontward from the motor and rotatable with a rotational force from the motor;
 a vibrator between the motor and the output unit, the vibrator being configured to switch the output unit between vibrating in a front-rear direction and not vibrating in the front-rear direction;
 a trigger lever operable to activate the motor;
 a forward-reverse switch lever operable to change a rotation direction of the motor;
 a motor housing accommodating the motor;
 a grip housing extending downward from the motor housing;
 an operation button on the motor housing, the operation button being operable to change a drive condition of the motor; and
 a controller configured to set the drive condition of the motor in response to an operation on the operation button.

The driver drill according to the above aspects of the present disclosure allows smooth change of the drive conditions of the motor.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear (or forward and backward), and up and down (or vertical). The terms indicate relative positions or directions with respect to the center of a driver drill.

The driver drill includes a motor. In the embodiments, a direction parallel to a rotation axis AX of the motor is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

In the embodiments, the rotation axis AX extends in the front-rear direction. The axial direction corresponds to the front-rear direction. The axial direction is from the rear to the front (first axial direction) or from the front to the rear (second axial direction). A position nearer the rotation axis AX in the radial direction, or a radial direction toward the rotation axis AX, is referred to as radially inside or radially inward for convenience. A position farther from the rotation axis AX in the radial direction, or a radial direction away from the rotation axis AX, is referred to as radially outside or radially outward for convenience.

Overview of Driver Drill

Figure 1:
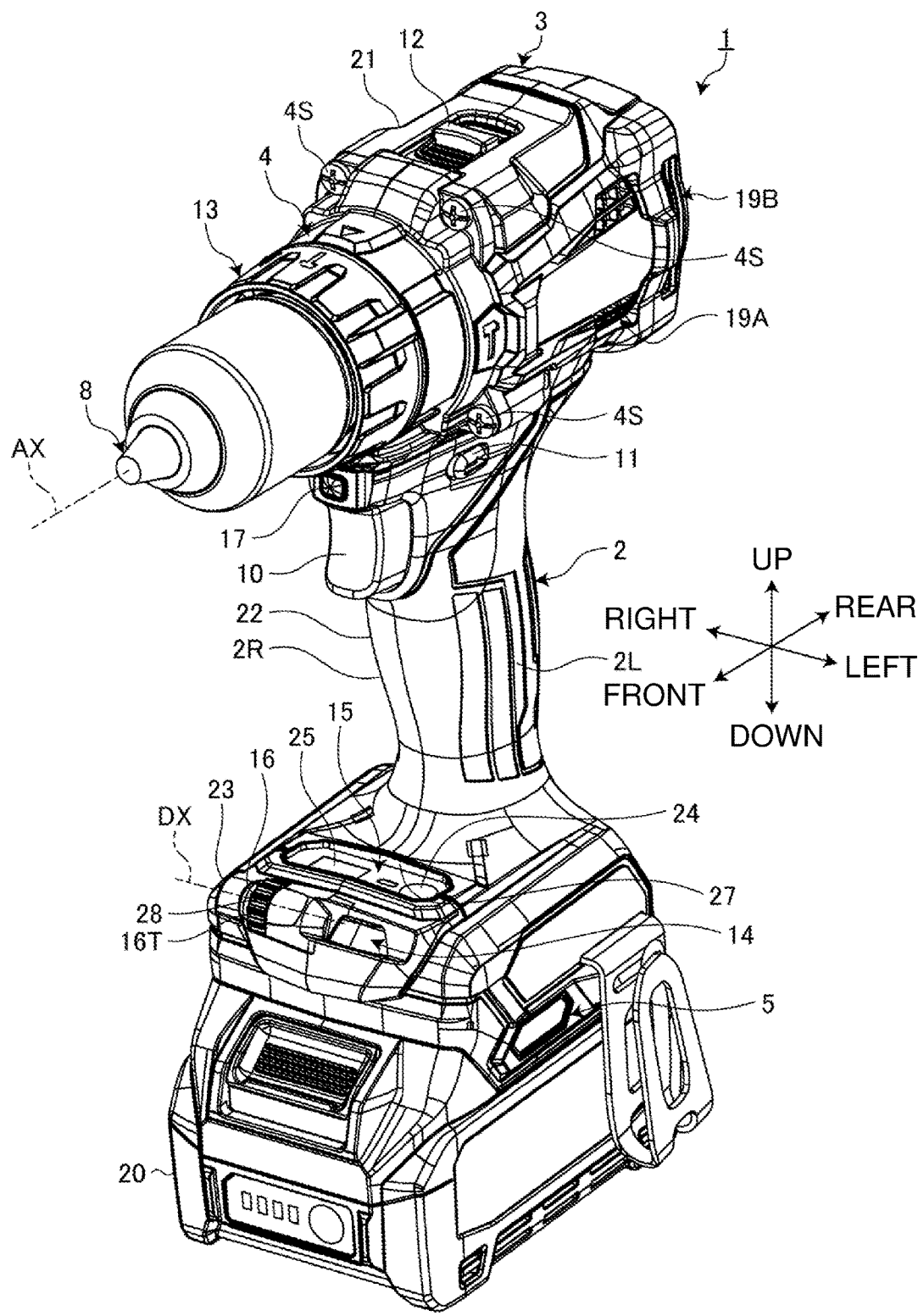
FIG. 1 is a front perspective view of a driver drill according to an embodiment.
Figure 2:
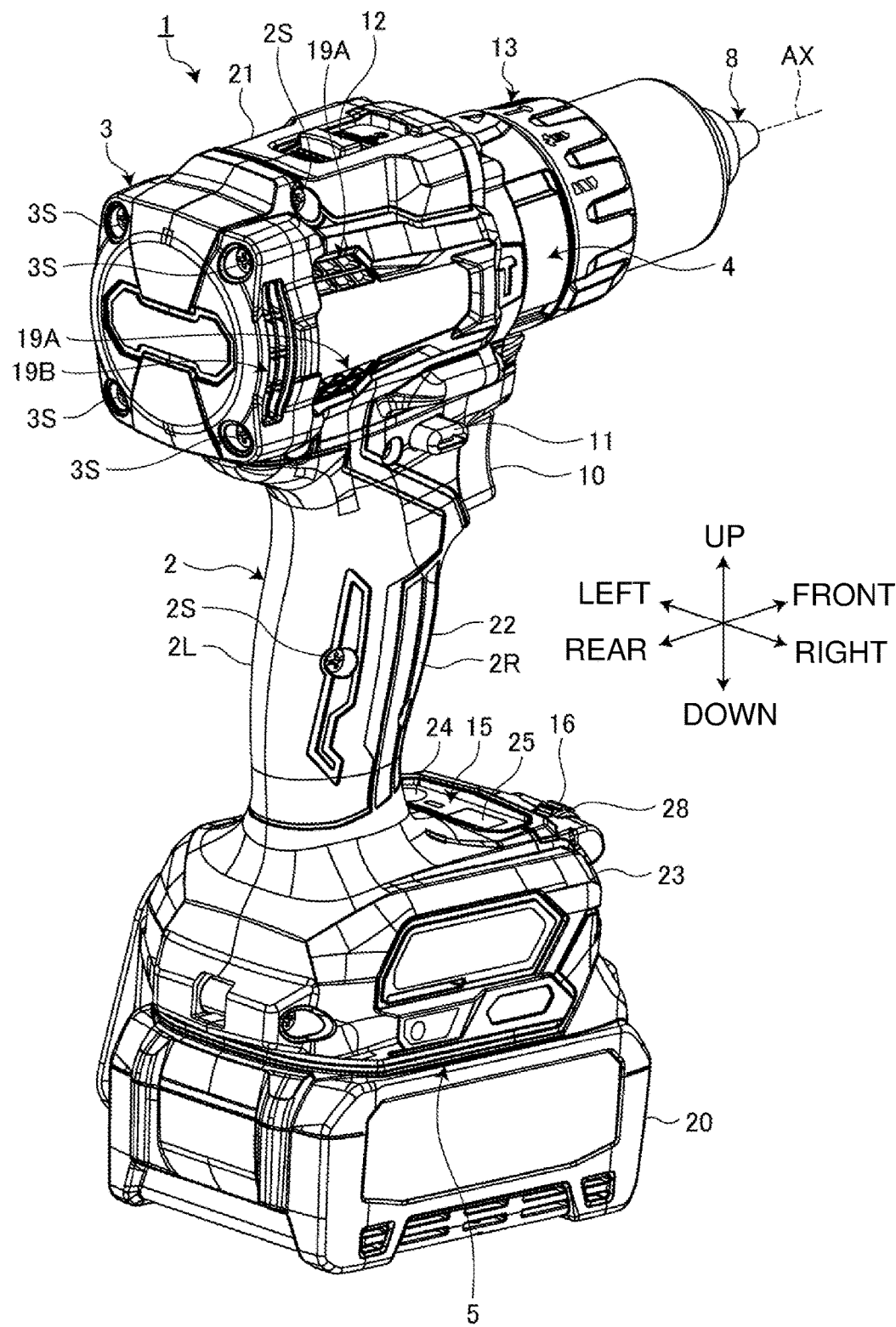
FIG. 2 is a rear perspective view of the driver drill according to the embodiment.
Figure 3:
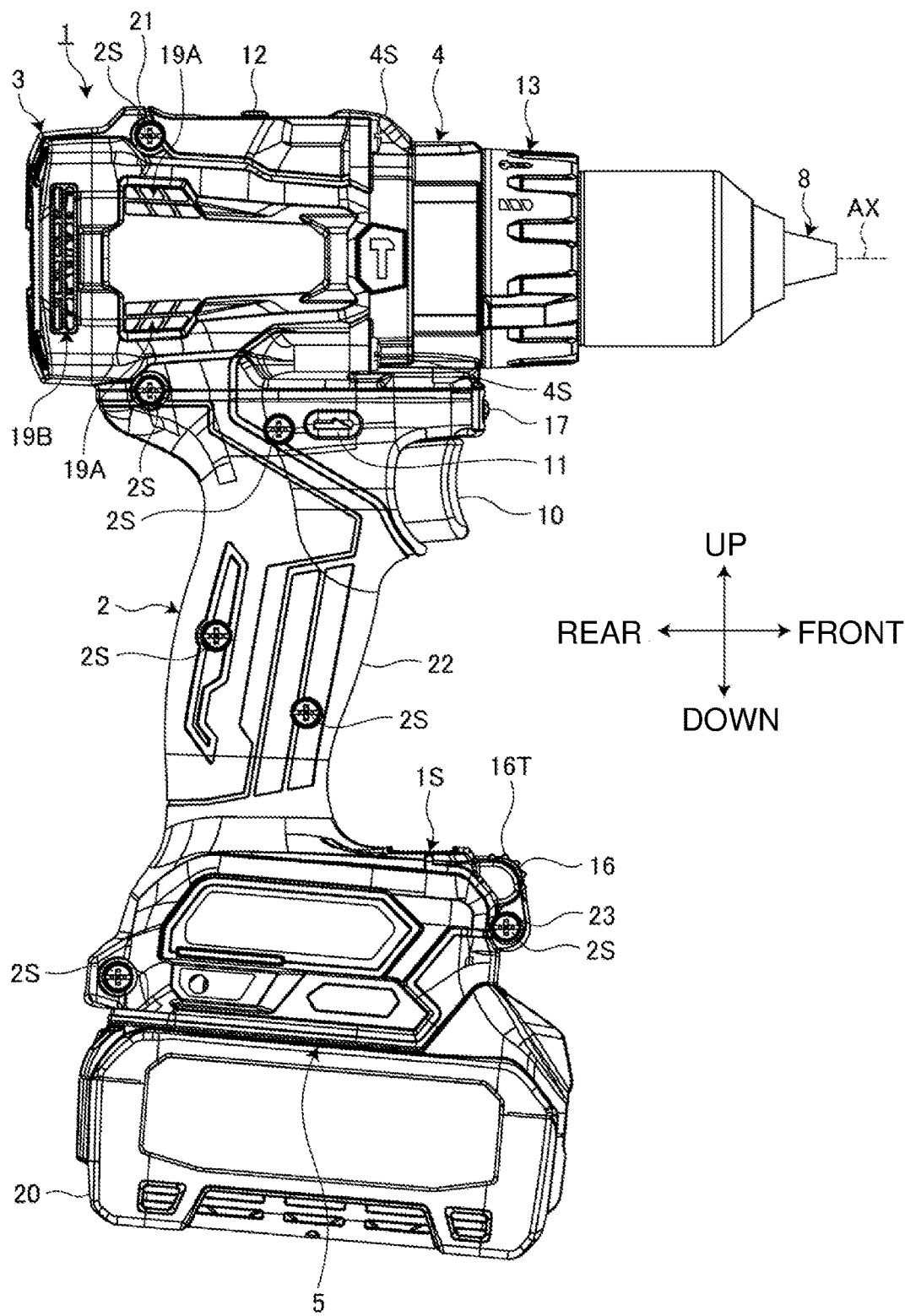
FIG. 3 is a side view of the driver drill according to the embodiment.

FIG. 1 is a front perspective view of a driver drill 1 according to an embodiment. FIG. 2 is a rear perspective view of the driver drill 1 according to the embodiment. FIG.

Figure 4:
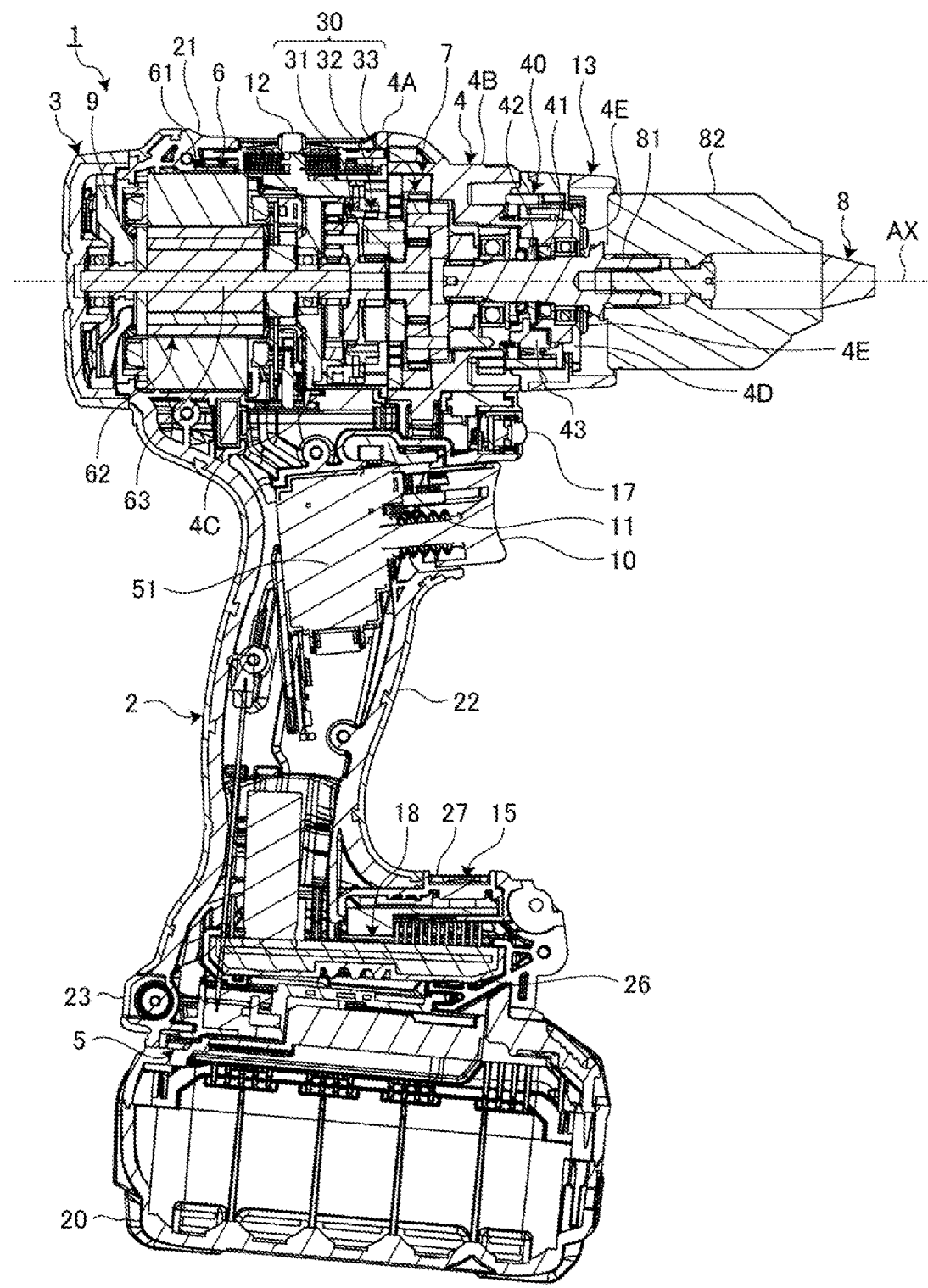
FIG. 4 is a sectional view of the driver drill according to the embodiment.

3 is a side view of the driver drill 1 according to the embodiment. FIG. 4 is a sectional view of the driver drill 1 according to the embodiment. The driver drill 1 according to the embodiment is a vibration driver drill.

As shown in FIGS. 1 to 4, the driver drill 1 includes a housing 2, a rear cover 3, a casing 4, a battery mount 5, a motor 6, a power transmission 7, an output unit 8, a fan 9, a trigger lever 10, a forward-reverse switch lever 11, a speed switch lever 12, a mode switch ring 13, a light unit 14, an interface panel 15, a dial 16, a hand switch 17, and a controller 18.

The housing 2 is formed from a synthetic resin. The housing 2 in the embodiment is formed from nylon. The housing 2 includes a left housing 2L and a right housing 2R. The left and right housings 2L and 2R are fastened together with screws 2S to form the housing 2.

The housing 2 includes a motor compartment 21, a grip 22, and a battery holder 23.

The motor compartment 21 accommodates the motor 6. The motor compartment 21 is cylindrical.

The grip 22 is grippable by an operator. The grip 22 is located below the motor compartment 21. The grip 22 extends downward from the motor compartment 21. The trigger lever 10 is located in a front portion of the grip 22.

The battery holder 23 accommodates the controller 18. The battery holder 23 is located below the grip 22. The battery holder 23 is connected to a lower end of the grip 22. The battery holder 23 has larger outer dimensions than the grip 22 in the front-rear and lateral directions.

The rear cover 3 is formed from a synthetic resin. The rear cover 3 is located behind the motor compartment 21. The rear cover 3 accommodates the fan 9. The rear cover 3 covers a rear opening of the motor compartment 21. The rear cover 3 is fastened to the motor compartment 21 with screws 3S.

The motor compartment 21 has inlets 19A. The rear cover 3 has outlets 19B. Air outside the housing 2 flows into an internal space of the housing 2 through the inlets 19A. Air inside the housing 2 flows out of the housing 2 through the outlets 19B.

The casing 4 accommodates the power transmission 7. The casing 4 includes a first casing 4A and a second casing 4B. The second casing 4B is located in front of the first casing 4A. The mode switch ring 13 is located in front of the second casing 4B. The first casing 4A is formed from a synthetic resin. The second casing 4B is formed from a metal. The second casing 4B in the embodiment is formed from aluminum. The casing 4 is located in front of the motor compartment 21. The first casing 4A and the second casing 4B are cylindrical.

The first casing 4A is fixed to the rear end of the second casing 4B. The first casing 4A has a rear opening covered by a bracket plate 4C. The second casing 4B has a front opening covered by a stop plate 4D. The stop plate 4D is fastened to the front end of the second casing 4B with screws 4E.

The casing 4 covers a front opening of the motor compartment 21. The first casing 4A is located inside the motor compartment 21. The second casing 4B is fastened to the motor compartment 21 with screws 4S.

The battery mount 5 is located in a lower portion of the battery holder 23. The battery mount 5 is connected to a battery pack 20. The battery pack 20 is attached to the battery mount 5 in a detachable manner. The battery pack 20 includes a secondary battery. The battery pack 20 in the embodiment includes a rechargeable lithium-ion battery. The battery pack 20 is attached to the battery mount 5 to power the driver drill 1. The motor 6 is driven by power supplied from the battery pack 20. The interface panel 15 and the controller 18 operate on power supplied from the battery pack 20.

The motor 6 powers the driver drill 1. The motor 6 is a brushless inner-rotor motor. The motor 6 is accommodated in the motor compartment 21. The motor 6 includes a cylindrical stator 61 and a rotor 62 located inside the stator 61. The rotor 62 includes a rotor shaft 63 extending in the axial direction.

The power transmission 7 is located in front of the motor 6. The power transmission 7 is accommodated in the casing 4. The power transmission 7 connects the rotor shaft 63 and the output unit 8 together. The power transmission 7 transmits power generated by the motor 6 to the output unit 8. The power transmission 7 includes multiple gears.

The power transmission 7 includes a reducer 30 and a vibrator 40.

The reducer 30 reduces rotation of the rotor shaft 63 and rotates the output unit 8 at a lower rotational speed than the rotor shaft 63. The reducer 30 in the embodiment includes a first planetary gear assembly 31, a second planetary gear assembly 32, and a third planetary gear assembly 33. The second planetary gear assembly 32 is located in front of the first planetary gear assembly 31. The third planetary gear assembly 33 is located in front of the second planetary gear assembly 32.

The vibrator 40 vibrates the output unit 8 in the axial direction. The vibrator 40 includes a first cam 41, a second cam 42, and a vibration switch ring 43.

The output unit 8 is located frontward from the motor 6. The output unit 8 rotates with a rotational force from the motor 6. The output unit 8 holding a tip tool rotates with a rotational force transmitted from the motor 6 through the power transmission 7. The output unit 8 includes a spindle 81 and a chuck 82. The spindle 81 rotates about the rotation axis AX with a rotational force transmitted from the motor 6. The chuck 82 receives the tip tool.

The fan 9 is located behind the motor 6. The fan 9 generates an airflow for cooling the motor 6. The fan 9 is fixed to at least a part of the rotor 62. The fan 9 is fixed to a rear portion of the rotor shaft 63. The fan 9 rotates together with the rotor shaft 63 as the rotor shaft 63 rotates. Thus, air outside the housing 2 flows into the internal space of the housing 2 through the inlets 19A. Air flowing into the internal space of the housing 2 flows through the housing 2 and cools the motor 6. The air passing through the housing 2 flows out of the housing 2 through the outlets 19B.

The trigger lever 10 is operable to activate the motor 6. The trigger lever 10 is located in an upper portion of the grip 22. The trigger lever 10 has a front end protruding frontward from the front portion of the grip 22. The trigger lever 10 is movable in the front-rear direction. The trigger lever 10 is operable by the operator. The trigger lever 10 is operated to move backward to activate the motor 6. When the trigger lever 10 is released from being operated, the motor 6 is stopped.

The forward-reverse switch lever 11 is operable to change the rotation direction of the motor 6. The forward-reverse switch lever 11 is located in the upper portion of the grip 22. The forward-reverse switch lever 11 has a left end protruding leftward from a left portion of the grip 22. The forward-reverse switch lever 11 has a right end protruding rightward from a right portion of the grip 22. The forward-reverse switch lever 11 is laterally movable. The forward-reverse switch lever 11 is operable by the operator. The forward-reverse switch lever 11 moves leftward to rotate the motor 6 forward. The forward-reverse switch lever 11 moves rightward to rotate the motor 6 reversely. Switching the rotation direction of the motor 6 switches the rotation direction of the spindle 81.

The speed switch lever 12 changes the speed mode of the reducer 30. The speed switch lever 12 is located in an upper portion of the motor compartment 21. The speed switch lever 12 is movable in the front-rear direction. The speed switch lever 12 is operable by the operator. The speed mode of the reducer 30 includes a low-speed mode and a high-speed mode. In the low-speed mode, the output unit 8 rotates at a low speed. In the high-speed mode, the output unit 8 rotates at a high speed. The speed switch lever 12 moves forward to set the reducer 30 to the low-speed mode. The speed switch lever 12 moves backward to set the reducer 30 to the high-speed mode.

The mode switch ring 13 is operable to change the operation mode of the vibrator 40. The mode switch ring 13 is located in front of the casing 4. The mode switch ring 13 is rotatable. The mode switch ring 13 is operable by the operator. The operation mode of the vibrator 40 includes a vibration mode and a non-vibration mode. In the vibration mode, the output unit 8 vibrates in the axial direction. In the non-vibration mode, the output unit 8 does not vibrate in the axial direction. The mode switch ring 13 is placed at a vibration mode position to set the vibrator 40 to the vibration mode. The mode switch ring 13 is placed at a non-vibration mode position to set the vibrator 40 to the non-vibration mode.

The light unit 14 emits illumination light to illuminate ahead of the driver drill 1. The light unit 14 includes, for example, a light-emitting diode (LED). The light unit 14 is located in a front left portion of the battery holder 23.

The interface panel 15 is located on the battery holder 23. The interface panel 15 includes an operation unit 24 and a display 25. The interface panel 15 is a plate. The operation unit 24 includes an operation button. The display 25 is, for example, a segment display including multiple segment light emitters, a flat display panel such as a liquid crystal display, or an indicator display including multiple LEDs.

The battery holder 23 has a panel opening 27. The panel opening 27 is located in an upper surface of the battery holder 23 and frontward from the grip 22. The panel opening 27 receives at least a part of the interface panel 15.

The operation unit 24 is operable to change the drive mode of the motor 6. The operation unit 24 is operable by the operator. The drive mode of the motor 6 includes a drill mode and a clutch mode. In the drill mode, the motor 6 is driven independently of the torque applied to the motor 6 in driving the motor 6. In the clutch mode, the motor 6 is stopped in response to a torque value applied to the motor 6 in driving the motor 6 exceeding a torque threshold.

The dial (first operation member) 16 is operable to change the drive conditions of the motor 6. The dial 16 is located in a front right portion of the battery holder 23. The dial 16 is rotatable about a dial axis DX. The dial axis DX extends laterally. The dial 16 is rotatable by 360° or greater. The dial 16 is operable by the operator. The drive conditions of the motor 6 include the torque threshold. The dial 16 is operable to change the torque threshold in the clutch mode set by the operation unit 24.

The battery holder 23 has a dial opening 28. The dial opening 28 is located in the front right portion of the battery holder 23. The dial opening 28 receives at least a part of the dial 16.

The hand switch (second operation member) 17 is operable to change the drive conditions of the motor 6. The hand switch 17 is located upward from the dial 16. The hand switch 17 is located on the grip 22 or the motor compartment 21. The hand switch 17 in the embodiment is located above the trigger lever 10 and below the mode switch ring 13 in the front portion of the grip 22. The forward-reverse switch lever 11 and the hand switch 17 are at least partially located at the same height.

The hand switch 17 has a front end protruding frontward from the front portion of the grip 22. The hand switch 17 is movable in the front-rear direction. The hand switch 17 is operable by the operator. The hand switch 17 is a push switch. The hand switch 17 is pushed backward to change the drive conditions of the motor 6. As described above, the drive conditions of the motor 6 include the torque threshold. In the clutch mode, a single push on the hand switch 17 changes the torque threshold by a predetermined value.

The controller 18 includes a computer system. The controller 18 outputs a control command for controlling the motor 6. The controller 18 is at least partially accommodated in a controller case 26. The controller 18 is accommodated in the battery holder 23 while being held by the controller case 26. The controller 18 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a transistor, a capacitor, and a resistor.

The controller 18 sets the drive conditions of the motor 6 in response to an operation on at least one of the dial 16 or the hand switch 17. As described above, the drive conditions of the motor 6 include the torque threshold. The controller 18 sets the torque threshold in response to an operation on at least one of the dial 16 or the hand switch 17 in the clutch mode.

In the clutch mode, the controller 18 stops the motor 6 in response to a torque value applied to the motor 6 in driving the motor 6 exceeding the set torque threshold.

The controller 18 displays the set drive conditions of the motor 6 on the display 25. The controller 18 displays the set torque threshold on the display 25.

Motor and Power Transmission

Figure 5:
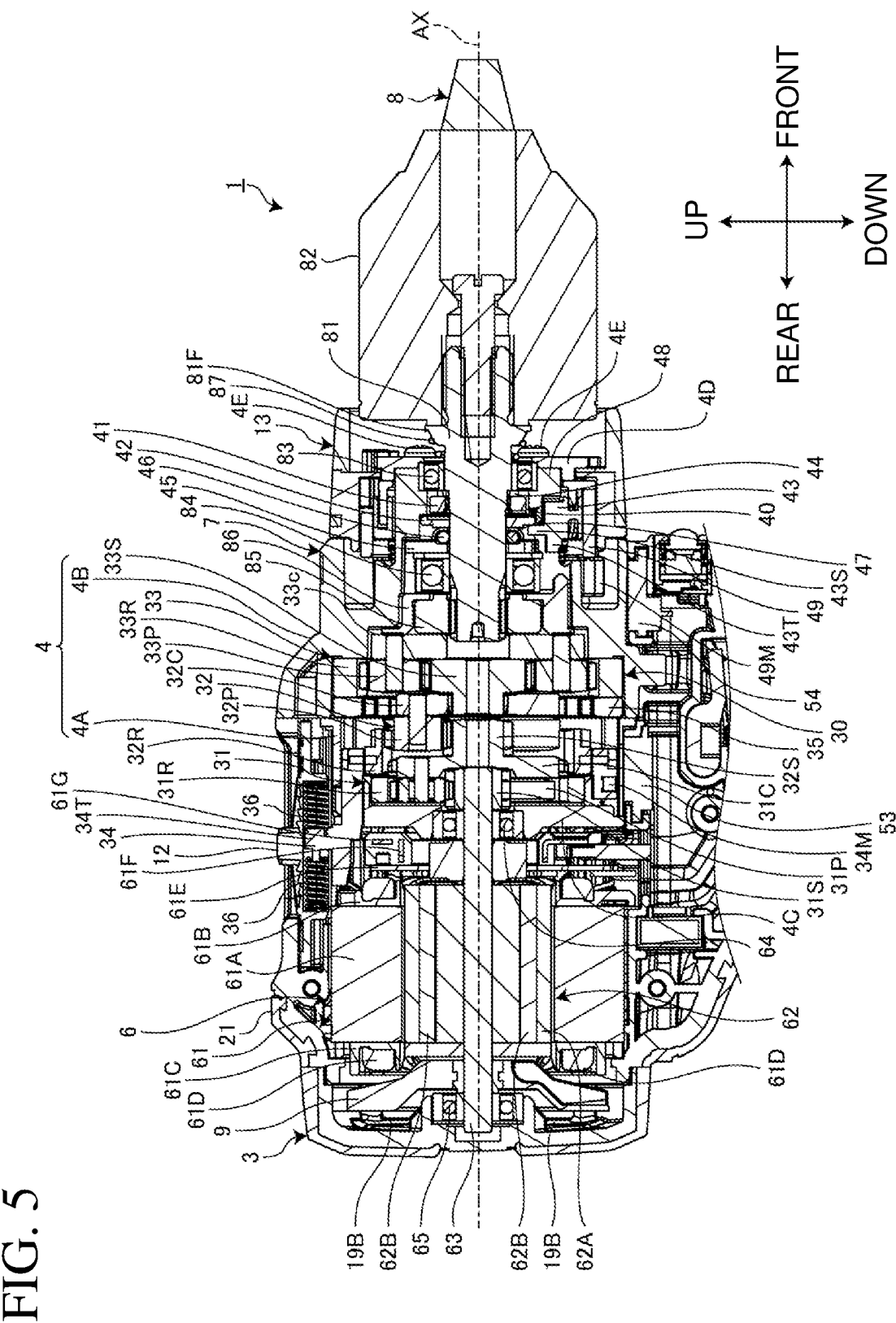
FIG. 5 is a partial sectional view of the driver drill according to the embodiment.

FIG. 5 is a partial sectional view of the driver drill 1 according to the embodiment. As shown in FIG. 5, the motor 6 includes the cylindrical stator 61 and the rotor 62 located inside the stator 61. The rotor 62 includes the rotor shaft 63 extending in the axial direction.

The stator 61 includes a stator core 61A, a front insulator 61B, a rear insulator 61C, multiple coils 61D, a sensor circuit board 61E, fusing terminals 61F, and short-circuiting members 61G. The stator core 61A includes multiple steel plates stacked on one another. The front insulator 61B is located in front of the stator core 61A. The rear insulator 61C is located behind the stator core 61A. The coils 61D are wound around the stator core 61A with the front insulator 61B and the rear insulator 61C between them. The sensor circuit board 61E is attached to the front insulator 61B. The fusing terminals 61F are connected to the coils 61D. The short-circuiting members 61G are supported by the front insulator 61B. The sensor circuit board 61E includes multiple rotation detectors to detect rotation of the rotor 62. The short-circuiting members 61G connect the multiple coils 61D with the fusing terminals 61F. The short-circuiting members 61G are connected to the controller 18 with lead wires.

The rotor 62 rotates about the rotation axis AX. The rotor 62 includes the rotor shaft 63, a rotor core 62A, and multiple permanent magnets 62B. The rotor core 62A surrounds the rotor shaft 63. The multiple permanent magnets 62B are held by the rotor core 62A. The rotor core 62A is cylindrical. The rotor core 62A includes multiple steel plates stacked on one another. The rotor core 62A has multiple through-holes extending in the axial direction and aligned circumferentially. The permanent magnets 62B are placed in the respective through-holes in the rotor core 62A.

The rotation detectors in the sensor circuit board 61E detect the magnetic fields of the permanent magnets 62B to detect rotation of the rotor 62. The controller 18 provides a drive current to the coils 61D based on the detection data from the rotation detectors.

The rotor shaft 63 rotates about the rotation axis AX. The rotation axis AX of the rotor shaft 63 is aligned with the rotation axis of the output unit 8. The rotor shaft 63 has a front portion rotatably supported by a bearing 64. The rotor shaft 63 has a rear portion rotatably supported by a bearing 65. The bearing 64 is held by the bracket plate 4C located in front of the stator 61. The bearing 65 is held by the rear cover 3. The rotor shaft 63 has its front end located frontward from the bearing 64 in an internal space of the casing 4.

A pinion gear 31S is located at the front end of the rotor shaft 63. The rotor shaft 63 is connected to the first planetary gear assembly 31 in the reducer 30 with the pinion gear 31S.

The first planetary gear assembly 31 includes multiple planetary gears 31P, a first carrier 31C, and an internal gear 31R. The planetary gears 31P surround the pinion gear 31S. The first carrier 31C supports the planetary gears 31P. The internal gear 31R surrounds the planetary gears 31P. The first carrier 31C includes a gear on its outer periphery.

The second planetary gear assembly 32 includes a sun gear 32S, multiple planetary gears 32P, a second carrier 32C, and an internal gear 32R. The planetary gears 32P surround the sun gear 32S. The second carrier 32C supports the planetary gears 32P. The internal gear 32R surrounds the planetary gears 32P. The sun gear 32S is located in front of the first carrier 31C. The sun gear 32S has a smaller diameter than the first carrier 31C. The sun gear 32S is integral with the first carrier 31C. The sun gear 32S and the first carrier 31C rotate together.

The third planetary gear assembly 33 includes a sun gear 33S, multiple planetary gears 33P, a third carrier 33C, and an internal gear 33R. The planetary gears 33P surround the sun gear 33S. The third carrier 33C supports the planetary gears 33P. The internal gear 33R surrounds the planetary gears 33P. The sun gear 33S is located in front of the second carrier 32C.

The reducer 30 includes a speed switch ring 34 and a connection ring 35. The speed switch ring 34 is connected to the speed switch lever 12. The connection ring 35 is located in front of the speed switch ring 34. The connection ring 35 is fixed to the inner surface of the first casing 4A. The connection ring 35 includes a gear on its inner periphery. The speed switch ring 34 includes a protrusion 34T protruding upward. Coil springs 36 are located in front of and behind the protrusion 34T. The speed switch ring 34 is connected to the speed switch lever 12 with the coil springs 36 in between.

The speed switch ring 34 switches between the low-speed mode and the high-speed mode. The speed switch ring 34 is connected to the internal gear 32R. The speed switch lever 12 is connected to the internal gear 32R with the speed switch ring 34. The speed switch lever 12 is movable together with the speed switch ring 34 and the internal gear 32R. The operator operates the speed switch lever 12 to move the speed switch ring 34 in the front-rear direction in the first casing 4A. The speed switch ring 34 moves between a low-speed mode position and a high-speed mode position in the front-rear direction with the internal gear 32R meshing with the planetary gears 32P. The high-speed mode position is located rearward from the low-speed mode position. The speed switch ring 34 thus switches between the low-speed mode and the high-speed mode. The speed switch lever 12 is operable to switch between the low-speed mode and the high-speed mode.

The internal gear 32R at the low-speed mode position is in contact with the connection ring 35. This restricts rotation of the internal gear 32R. The internal gear 32R at the high-speed mode position is apart from the connection ring 35. This allows rotation of the internal gear 32R.

The internal gear 32R at the low-speed mode position meshes with the planetary gears 32P. The internal gear 32R at the high-speed mode position meshes with both the planetary gears 32P and the first carrier 31C.

When the rotor shaft 63 rotates as driven by the motor 6 with the internal gear 32R at the low-speed mode position, the pinion gear 31S rotates, and the planetary gears 31P revolve about the pinion gear 31S. The first carrier 31C and the sun gear 32S then rotate at a lower rotational speed than the rotor shaft 63. The planetary gears 32P then revolve about the sun gear 32S. The second carrier 32C and the sun gear 33S then rotate at a lower rotational speed than the first carrier 31C. When the motor 6 is driven with the internal gear 32R at the low-speed mode position, both the first planetary gear assembly 31 and the second planetary gear assembly 32 operate for rotation reduction, causing the second carrier 32C and the sun gear 33S to rotate in the low-speed mode.

When the rotor shaft 63 rotates as driven by the motor 6 with the internal gear 32R at the high-speed mode position, the pinion gear 31S rotates, and the planetary gears 31P revolve about the pinion gear 31S. The first carrier 31C and the sun gear 32S then rotate at a lower rotational speed than the rotor shaft 63. The internal gear 32R at the high-speed mode position meshes with both the planetary gears 32P and the first carrier 31C. Thus, the internal gear 32R rotates together with the first carrier 31C.

As the internal gear 32R rotates, the planetary gears 32P revolve at the same revolution speed as the rotational speed of the internal gear 32R. The second carrier 32C and the sun gear 33S then rotate at the same rotational speed as the rotational speed of the first carrier 31C. When the motor 6 is driven with the internal gear 32R at the high-speed mode position, the first planetary gear assembly 31 operates for rotation reduction without the second planetary gear assembly 32 operating for rotation reduction, thus causing the second carrier 32C and the sun gear 33S to rotate in the high-speed mode.

As the second carrier 32C and the sun gear 33S rotate, the planetary gears 33P revolve about the sun gear 33S. This causes the third carrier 33C to rotate.

The spindle 81 is connected to the third carrier 33C with a lock cam 85. The spindle 81 is spline-coupled to the lock cam 85. The lock cam 85 is rotatably supported by a lock ring 86. The lock ring 86 is located inside the second casing 4B. The lock ring 86 is fixed to the second casing 4B. As the third carrier 33C rotates, the spindle 81 rotates.

The spindle 81 is rotatably supported by a bearing 83 and a bearing 84. The spindle 81, supported by the bearings 83 and 84, is movable in the front-rear direction.

The spindle 81 includes a flange 81F. A coil spring 87 is located between the flange 81F and the bearing 83. The coil spring 87 generates an elastic force for moving the spindle 81 forward.

The chuck 82 can hold the tip tool. The chuck 82 is connected to the front of the spindle 81. The chuck 82 rotates as the spindle 81 rotates. The chuck 82 holding the tip tool rotates.

The first cam 41 and the second cam 42 in the vibrator 40 are located inside the second casing 4B. The first cam 41 and the second cam 42 are located between the bearings 83 and 84 in the front-rear direction.

The first cam 41 is annular. The first cam 41 surrounds the spindle 81. The first cam 41 is fixed to the spindle 81. The first cam 41 rotates together with the spindle 81. The first cam 41 includes cam teeth on its rear surface. The first cam 41 is supported by a stop ring 44. The stop ring 44 surrounds the spindle 81. The stop ring 44 is located between the first cam 41 and the bearing 83 in the front-rear direction. The elastic force from the coil spring 87 causes the stop ring 44 to come in contact with a rear surface of the bearing 83.

The second cam 42 is annular. The second cam 42 is located behind the first cam 41. The second cam 42 surrounds the spindle 81. The second cam 42 is rotatable relative to the spindle 81. The second cam 42 includes cam teeth on its front surface. The cam teeth on the front surface of the second cam 42 mesh with the cam teeth on the rear surface of the first cam 41. The second cam 42 includes a tab on its rear surface.

A support ring 45 is located between the second cam 42 and the bearing 84 in the front-rear direction. The support ring 45 is located inside the second casing 4B. The support ring 45 is fixed to the second casing 4B. The support ring 45 includes multiple steel balls 46 on its front surface. A washer 47 is located between the steel balls 46 and the second cam 42. The second cam 42 is rotatable while being restricted from moving back and forth in a space defined by a small diameter portion 402 and the washer 47.

The vibration switch ring 43 switches between the vibration mode and the non-vibration mode. The mode switch ring 13 is connected to the vibration switch ring 43 with a cam ring 48. The mode switch ring 13 is rotatable together with the cam ring 48. The vibration switch ring 43 is movable in the front-rear direction. The vibration switch ring 43 includes a projection 43T. The projection 43T is placed into a guide hole in the second casing 4B. The vibration switch ring 43 is movable in the front-rear direction while being guided by the guide hole in the second casing 4B. The projection 43T restricts rotation of the vibration switch ring 43. The operator operates the mode switch ring 13 to move the vibration switch ring 43 in the front-rear direction. The vibration switch ring 43 moves in the front-rear direction between an advanced position and a retracted position to switch between the vibration mode and the non-vibration mode. The retracted position is located rearward from the advanced position. The mode switch ring 13 is operable to switch between the vibration mode and the non-vibration mode.

The vibration mode includes a restricted state of rotation of the second cam 42. The non-vibration mode includes a rotatable state of the second cam 42. When the vibration switch ring 43 moves to the advanced position, the second cam 42 is restricted from rotating. When the vibration switch ring 43 moves to the retracted position, the second cam 42 becomes rotatable.

In the vibration mode, the vibration switch ring 43 at the advanced position is at least partially in contact with the second cam 42. This restricts rotation of the second cam 42. When the motor 6 is driven in this state, the first cam 41 fixed to the spindle 81 rotates in contact with the cam teeth on the second cam 42. The spindle 81 thus rotates while vibrating in the front-rear direction.

In the non-vibration mode, the vibration switch ring 43 at the retracted position is apart from the second cam 42. This allows rotation of the second cam 42. When the motor 6 is driven in this state, the second cam 42 rotates together with the first cam 41 and the spindle 81. The spindle 81 thus rotates without vibrating in the front-rear direction.

The vibration switch ring 43 surrounds the first cam 41 and the second cam 42. The vibration switch ring 43 has an opposing portion 43S facing the rear surface of the second cam 42. The opposing portion 43S protrudes radially inward from a rear portion of the vibration switch ring 43.

When the mode switch ring 13 is operated to move the vibration switch ring 43 to the advanced position, the tab on the rear surface of the second cam 42 is in contact with the opposing portion 43S of the vibration switch ring 43. This restricts rotation of the second cam 42. The vibrator 40 is thus switched to the vibration mode.

When the mode switch ring 13 is operated to move the vibration switch ring 43 to the retracted position, the opposing portion 43S of the vibration switch ring 43 is apart from the second cam 42. This allows rotation of the second cam 42. The vibrator 40 is thus switched to the non-vibration mode.

Dial

Figure 6:
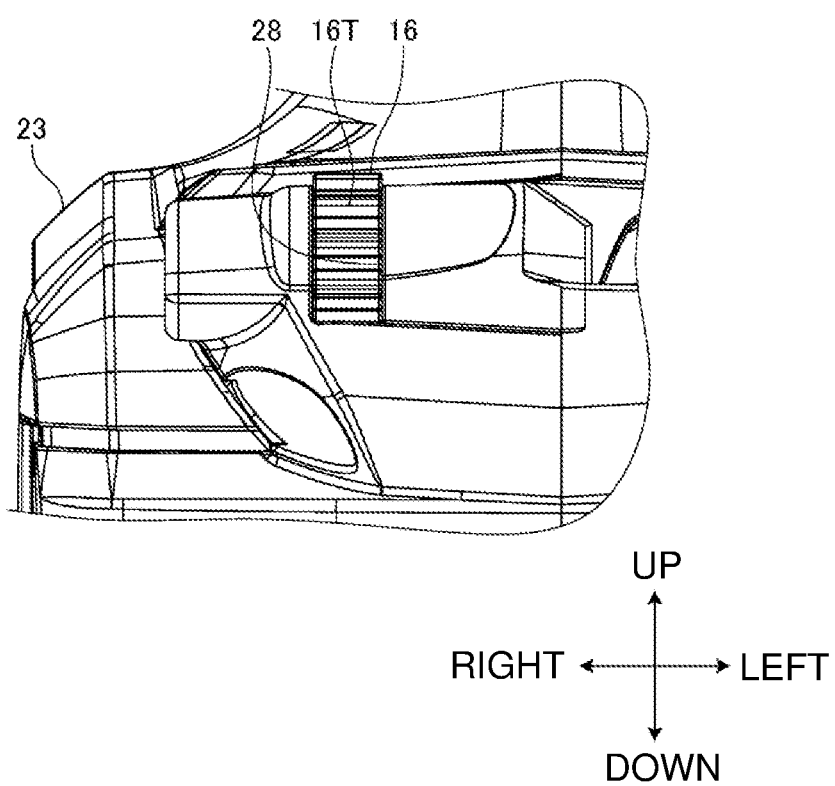
FIG. 6 is a front view of a dial in the embodiment.
Figure 7:
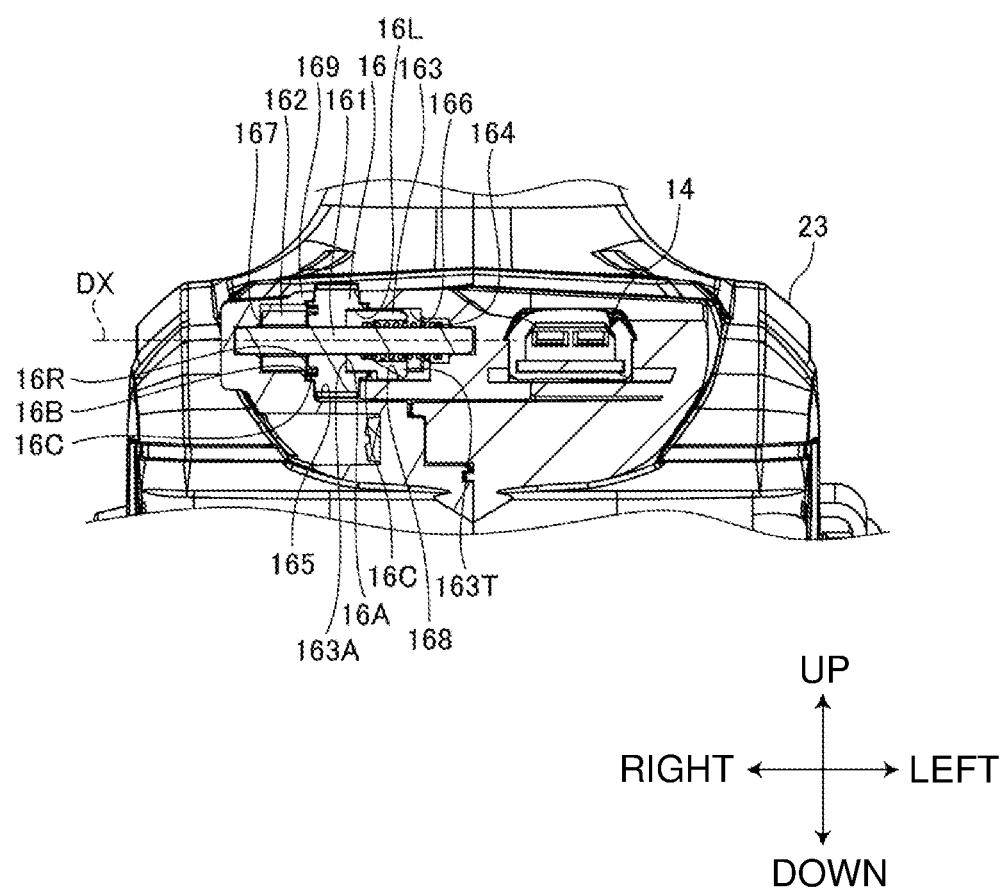
FIG. 7 is a sectional view of the dial and a light unit in the embodiment.

FIG. 6 is a front view of the dial 16 in the embodiment. FIG. 7 is a sectional view of the dial 16 and the light unit 14 in the embodiment. As shown in FIGS. 1 to 4, 6, and 7, the dial 16 is located in the front right portion of the battery holder 23. The light unit 14 is located in the front left portion of the battery holder 23.

The battery holder 23 has the dial opening 28 receiving at least a part of the dial 16. The dial opening 28 is included in the front right portion of the battery holder 23.

The dial 16 is located in front of the controller 18. The dial 16 is cylindrical. The dial 16 is operable by the operator. The dial 16 has a surface with multiple protrusions 16T. The protrusions 16T prevent slipping. The dial 16 includes a front portion and an upper portion located outward from the surface of the battery holder 23.

The dial 16 rotates about the dial axis DX extending laterally. As described above, the motor 6 has the rotation axis AX extending in the front-rear direction. In the embodiment, the rotation axis AX of the motor 6 and an axis parallel to the dial axis DX are orthogonal to each other.

The driver drill 1 includes a rod 161, permanent magnets 162, a cam 163, and a coil spring 164. The rod 161 is located inside the dial 16. The permanent magnets 162 are supported by the rod 161. The cam 163 is supported by the rod 161. The coil spring 164 surrounds the rod 161.

The rod 161 is located in front of the controller 18, and is supported by at least a part of the battery holder 23. The rod 161 has a left end and a right end each supported by the battery holder 23.

The dial 16 surrounds the rod 161. The dial 16 is rotatably supported by the rod 161. The dial 16 is rotatable by 360° or greater about the dial axis DX in both the forward direction and the reverse direction.

The dial 16 has a recess 16L on its left surface. The recess 16L receives a cam projection 16A. The dial 16 has a recess 16R on its right surface. The recess 16R receives a projection 16B. The left and right surfaces of the dial 16 each include an annular ridge 16C.

The permanent magnets 162 rotate together with the dial 16. The permanent magnets 162 and the dial 16 are located at different positions in the direction parallel to the dial axis DX. The permanent magnets 162 in the embodiment are located on the right of the dial 16. The permanent magnets 162 are arranged cylindrically. At least a part of the rod 161 is located inward from the permanent magnets 162. The permanent magnets 162 surround the rod 161. The permanent magnets 162 are fixed to the dial 16 with, for example, an adhesive.

The cam 163 and the dial 16 are located at different positions in the direction parallel to the dial axis DX. The cam 163 in the embodiment is located on the left of the dial 16. The cam 163 is cylindrical. The cam 163 receives at least a part of the rod 161. The cam 163 surrounds the rod 161. The cam 163 is laterally movable with respect to the rod 161. The cam 163 includes a cam projection 163A on its right surface. The cam 163 includes two protrusions 163T on its outer surface.

The coil spring 164 and the dial 16 are located at different positions in the direction parallel to the dial axis DX. The coil spring 164 in the embodiment is located on the left of the dial 16. The coil spring 164 receives at least a part of the rod 161. The coil spring 164 surrounds the rod 161. The coil spring 164 is at least partially located inside the cam 163.

The battery holder 23 has a central recess 165, a left recess 166, and a right recess 167. The central recess 165 receives the dial 16. The left recess 166 receives the cam 163. The right recess 167 receives the permanent magnets 162.

The left recess 166 has an inner surface at least partially holding the left end of the rod 161. The right recess 167 has an inner surface at least partially holding the right end of the rod 161.

The left recess 166 has a groove 168 inside receiving the protrusions 163T on the cam 163. This restricts rotation of the cam 163.

The cam 163 includes a right portion received in the recess 16L on the dial 16. The coil spring 164 includes a right portion received in the cam 163. The coil spring 164 includes a left portion supported on at least a part of the inner surface of the left recess 166. This restricts rotation of the coil spring 164. The coil spring 164 generates an elastic force for moving the cam 163 rightward.

When the operator operates the dial 16, the dial 16 rotates with respect to the cam 163 with the cam 163 pressed against the dial 16 by the coil spring 164. The dial 16 rotates with the cam projection 16A and the cam projection 163A in contact with each other. Thus, the dial 16 clicks while rotating.

Each permanent magnet 162 includes a left portion received in the recess 16R on the dial 16. The left portion of the permanent magnet 162 has a notch that receives the projection 16B when the left portion of the permanent magnet 162 is placed into the recess 16R on the dial 16. This restricts rotation of the dial 16 and the permanent magnets 162 with respect to each other. The permanent magnets 162 rotate together with the dial 16.

The left and right surfaces of the dial 16 each include the annular ridge 16C. The battery holder 23 includes a cover 169 covering the ridges 16C. The ridges 16C and the cover 169 prevent foreign objects from entering an internal space of the battery holder 23 through a space between the housing 2 and the dial 16.

Controller

Figure 8:
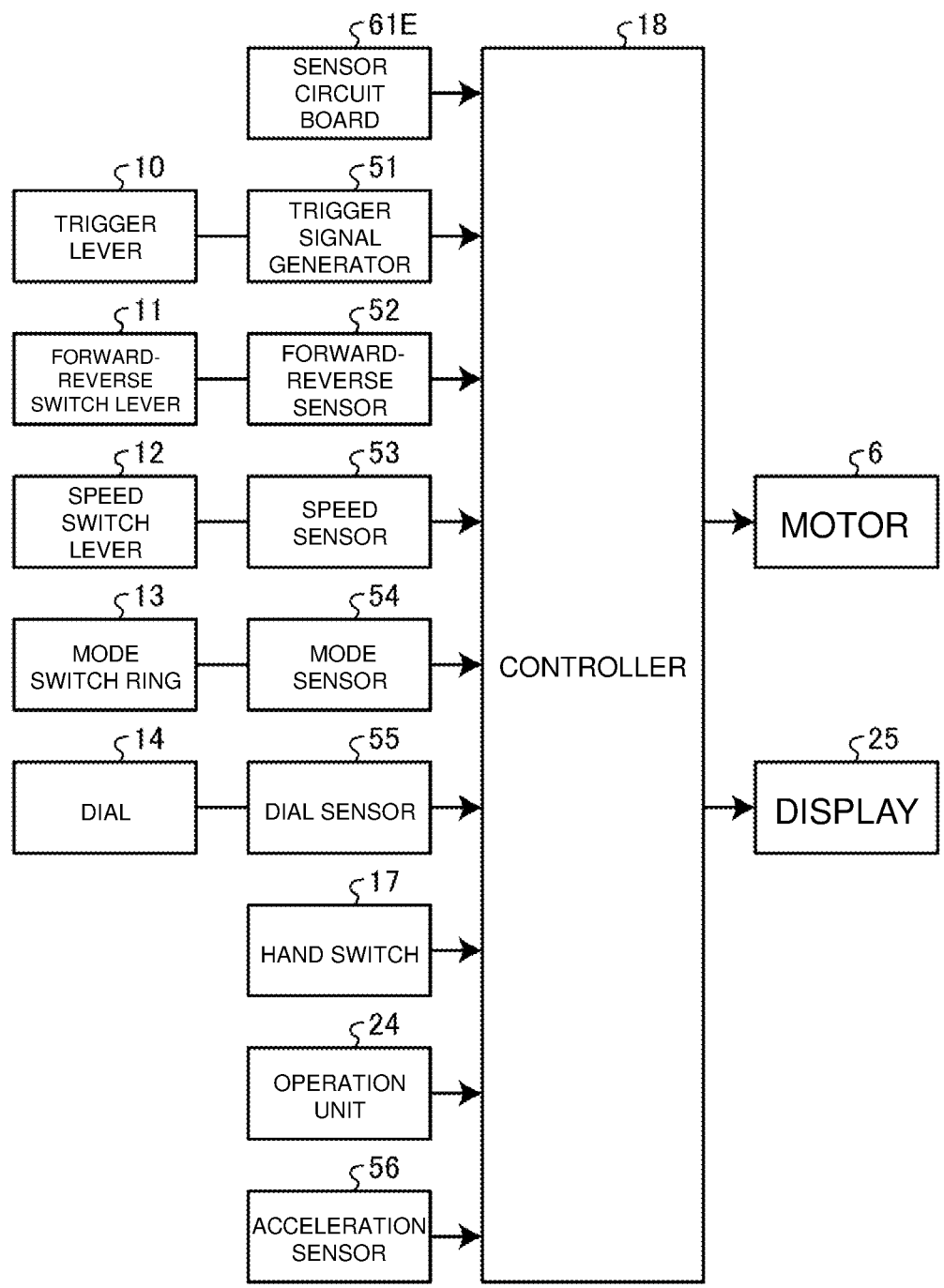
FIG. 8 is a block diagram of the driver drill according to the embodiment.

FIG. 8 is a block diagram of the driver drill 1 according to the embodiment. As shown in FIG. 8, the driver drill 1 includes the sensor circuit board 61E, the trigger lever 10, the forward-reverse switch lever 11, the speed switch lever 12, the mode switch ring 13, the dial 16, the hand switch 17, the operation unit 24, a trigger signal generator 51, a forward-reverse sensor 52, a speed sensor 53, a mode sensor 54, a dial sensor 55, an acceleration sensor 56, the controller 18, the motor 6, and the display 25.

The controller 18 calculates a torque value applied to the motor 6. The controller 18 calculates a torque value applied to the motor 6 based on a current value supplied to the coils 61D and the rotational speed of the rotor 62 detected by a rotation detector in the sensor circuit board 61E.

As shown in FIG. 4, the trigger signal generator 51 is located in the grip 22. The trigger signal generator 51 generates a trigger signal based on the amount of operation on the trigger lever 10. The trigger signal generated in the trigger signal generator 51 is output to the controller 18. The controller 18 drives the motor 6 in response to the trigger signal from the trigger signal generator 51.

The forward-reverse sensor 52 detects the operational state of the forward-reverse switch lever 11. The forward-reverse sensor 52 detects the position of the forward-reverse switch lever 11 that is laterally movable.

The forward-reverse sensor 52 outputs the detection data to the controller 18. The controller 18 detects the position of the speed switch lever 12 based on the detection data from the forward-reverse sensor 52. The controller 18 uses the detection data from the forward-reverse sensor 52 to determine whether the rotation direction of the motor 6 is set to the forward direction or to the reverse direction.

The speed sensor 53 detects the operational state of the speed switch lever 12. As shown in FIG. 5, the speed switch ring 34 includes a permanent magnet 34M. The speed sensor 53 is located below the speed switch ring 34. The speed sensor 53 includes a magnetic sensor, such as a Hall device. In response to an operation on the speed switch lever 12, the permanent magnet 34M moves in the front-rear direction along with the speed switch lever 12 and the speed switch ring 34. The speed sensor 53 detects a change in the magnetic field caused by the moving permanent magnet 34M.

The speed sensor 53 outputs the detection data to the controller 18. The controller 18 detects the position of the speed switch lever 12 based on the detection data from the speed sensor 53. The controller 18 uses the detection data from the speed sensor 53 to determine whether the reducer 30 is set to the high-speed mode or to the low-speed mode.

The mode sensor 54 detects the operational state of the mode switch ring 13. As shown in FIG. 5, a mode detection ring 49 is located inside and rotatable together with the mode switch ring 13. The mode detection ring 49 includes a permanent magnet 49M. The mode sensor 54 is located below the mode detection ring 49. The mode sensor 54 includes a magnetic sensor, such as a Hall device. In response to an operation on the mode switch ring 13, the permanent magnet 49M rotates together with the mode switch ring 13 and the mode detection ring 49. The mode sensor 54 detects a change in the magnetic field caused by the rotating permanent magnet 49M.

The mode sensor 54 outputs the detection data to the controller 18. The controller 18 detects the position of the mode switch ring 13 in the rotation direction based on the detection data from the mode sensor 54. The controller 18 uses the detection data from the mode sensor 54 to determine whether the vibrator 40 is set to the vibration mode or to the non-vibration mode.

The dial sensor 55 detects the operational state of the dial 16. The dial sensor 55 includes a magnetic sensor, such as a Hall device. The dial sensor 55 detects the permanent magnets 162. The dial sensor 55 is located behind the permanent magnets 162. In response to an operation on the dial 16, the permanent magnets 162 rotate together with the dial 16. The dial sensor 55 detects a change in the magnetic field caused by the rotating permanent magnets 162.

The permanent magnets 162 are arranged to each have an N pole and an S pole that alternate in the circumferential direction of the dial axis DX. The operator rotates the dial 16 about the dial axis DX in the forward direction or in the reverse direction. The permanent magnets 162 rotate together with the dial 16.

When the dial 16 is rotated and the S pole faces the dial sensor 55, the magnetic lines of force between the permanent magnets 162 and the dial sensor 55 are directed from the dial sensor 55 to the permanent magnets 162. When the dial 16 is rotated and the N pole and the S pole located above the N pole both face the dial sensor 55, the magnetic lines of force between the permanent magnets 162 and the dial sensor 55 are directed from the N pole to the S pole. When the dial 16 is rotated and the N pole faces the dial sensor 55, the magnetic lines of force between the permanent magnets 162 and the dial sensor 55 are directed from the permanent magnets 162 to the dial sensor 55. When the dial 16 is rotated and the S pole and the N pole located above the S pole both face the dial sensor 55, the magnetic lines of force between the permanent magnets 162 and the dial sensor 55 are directed from the N pole to the S pole.

Thus, the rotation angle of the dial 16 changes the direction of magnetic lines of force between the permanent magnets 162 and the dial sensor 55. In other words, the rotation angle of the dial 16 changes the magnetic field between the permanent magnets 162 and the dial sensor 55. The rotation direction of the dial 16 changes the magnetic field between the permanent magnets 162 and the dial sensor 55. The dial sensor 55 detects a change in the magnetic field to detect the rotation direction and the rotation angle of the dial 16.

The dial sensor 55 outputs the detection data to the controller 18. The controller 18 determines the rotation direction and the rotational speed of the dial 16 based on the detection data from the dial sensor 55. The detection data from the dial sensor 55 includes a clutch threshold in the clutch mode. In the clutch mode, the controller 18 sets a torque threshold based on the detection data from the dial sensor 55.

In response to an operation by the operator, the hand switch 17 generates operation data. The operation data generated by the hand switch 17 is transmitted to the controller 18. The operation data from the hand switch 17 includes the clutch threshold in the clutch mode. In the clutch mode, the controller 18 sets the torque threshold based on the operation data from the hand switch 17.

In response to an operation by the operator, the operation unit 24 generates operation data. The operation data generated by the operation unit 24 is transmitted to the controller 18. The operation data from the operation unit 24 includes the drill mode or the clutch mode. The controller 18 sets the drill mode or the clutch mode based on the operation data from the operation unit 24.

Operation of Driver Drill

Figure 9:
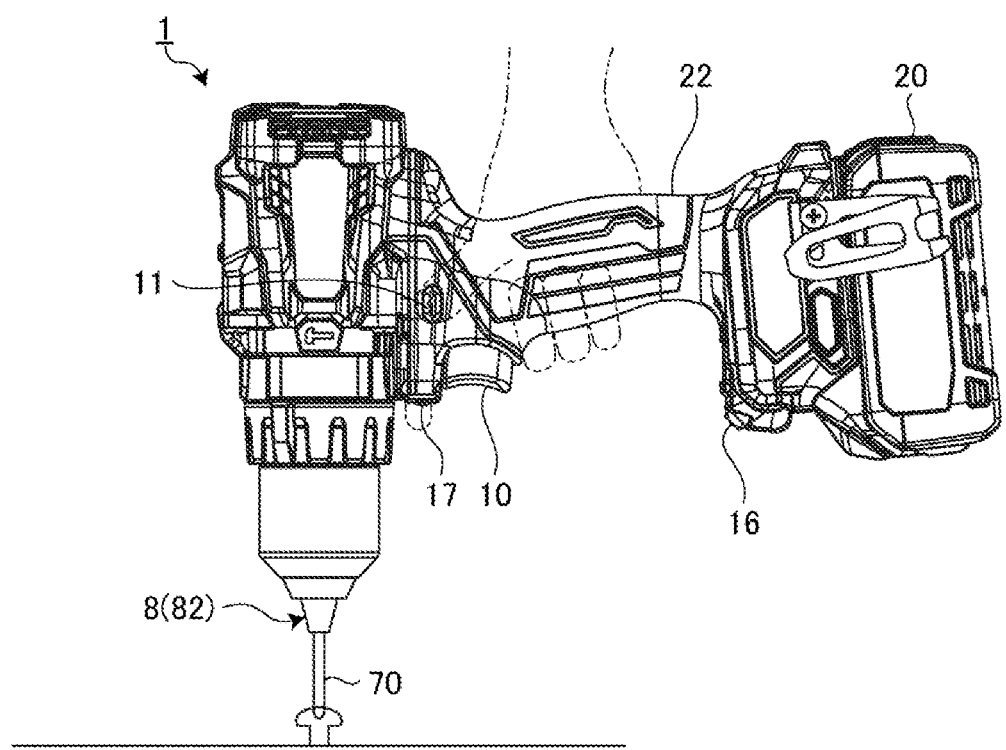
FIG. 9 is a diagram showing an example use of the driver drill according to the embodiment.

FIG. 9 is a diagram showing an example use of the driver drill 1 according to the embodiment. In FIG. 9, the driver drill 1 with a tip tool 70 attached to the output unit 8 is in a screwing operation.

An example screwing operation with the driver drill 1 in the clutch mode will be described below. The operator operates the mode switch ring 13 to set the vibrator 40 to the non-vibration mode, and selects the clutch mode by operating the operation unit 24.

In the clutch mode, the motor 6 stops in response to a torque value applied to the motor 6 in driving the motor 6 exceeding a torque threshold. After selecting the clutch mode, the operator operates at least one of the dial 16 or the hand switch 17 to set a torque threshold.

The dial 16 and the hand switch 17 are operable in different directions. The dial 16 is operable in the rotation direction about the dial axis DX. The hand switch 17 is operable in the front-rear direction. As the dial 16 and the hand switch 17 are operable in different directions, the operator can use the hand switch 17 to change the torque threshold, for example, in a work situation in which the dial 16 is difficult to operate. In a work situation in which the hand switch 17 is difficult to operate, for example, the operator can use the dial 16 to change the torque threshold.

The torque threshold may be set finely. For example, the controller 18 may set the torque threshold from 40 preset values.

When the torque threshold is set with the dial 16, for example, rotating the dial 16 in the forward direction by 45° increases the torque threshold to the next value. Rotating the dial 16 in the reverse direction by 45° decreases the torque threshold to the previous value. The dial 16 in the embodiment is rotatable by 360° or greater about the dial axis DX in both the forward direction and the reverse direction. Thus, the operator can set the torque threshold precisely from the 40 preset values by rotating the dial 16 in the forward direction or the reverse direction by 45°.

The rotation angle of the dial 16 for changing the torque threshold to the next value is not limited to 45°, and may be less than 45° or greater than 45°.

When the hand switch 17 is used to set the torque threshold, for example, a single push on the hand switch 17 in a first operational state in which the forward-reverse switch lever 11 is moved to the left position increases the torque threshold to the next value. Multiple pushes on the hand switch 17 in the first operational state increase the torque threshold by multiple preset values.

In a second operational state in which the forward-reverse switch lever 11 is moved to the right position, a single push on the hand switch 17 decreases the torque threshold to the previous value. Multiple pushes on the hand switch 17 in the second operational state decrease the torque threshold by multiple preset values.

The controller 18 uses the detection data from the forward-reverse sensor 52 to determine whether the forward-reverse switch lever 11 is in the first operational state or in the second operational state. The controller 18 thus can increase or decrease the torque threshold based on the detection data from the forward-reverse sensor 52 and the operation data from the hand switch 17.

In the first operational state, for example, a single push on the hand switch 17 may increase the torque threshold by two preset values or by any multiple values. In the second operational state, a single push on the hand switch 17 may decrease the torque threshold by two preset values or by any multiple values.

In some embodiments, pushing the hand switch 17 in the first operational state may decrease the torque threshold. Pushing the hand switch 17 in the second operational state may increase the torque threshold.

The number of preset values for the torque threshold is not limited to 40, and may be less than or more than 40.

In the clutch mode, the operator sets the torque threshold by operating the dial 16, for example, before starting the screwing operation.

The controller 18 displays the torque threshold set with the dial 16 on the display 25.

After setting the torque threshold, the operator operates the trigger lever 10 to activate the motor 6. The controller 18 controls the rotational speed of the motor 6 based on the amount of operation on the trigger lever 10. The controller 18 uses the detection data from the rotation detector in the sensor circuit board 61E to control the motor 6 to rotate the motor 6 at the target rotational speed determined based on the amount of operation on the trigger lever 10.

The controller 18 calculates a torque value applied to the motor 6. The controller 18 calculates a torque value applied to the motor 6 based on a current value supplied to the coils 61D and the rotational speed of the rotor 62 detected by the rotation detector in the sensor circuit board 61E.

The controller 18 stops the motor 6 in response to the calculated torque value applied to the motor 6 in driving the motor 6 exceeding the set torque threshold.

As shown in FIG. 9, when the motor 6 stops before a screw is fully screwed into a workpiece, the operator can operate the hand switch 17 to increase the torque threshold. The operator holding the grip 22 of the driver drill 1 with the right hand can operate the hand switch 17 with the right index finger or another finger, while remaining in a working posture for using the driver drill 1. In other words, the operator can adjust the torque threshold with one hand, while remaining in a working posture for using the driver drill 1.

The hand switch 17 included in a vibration driver drill in particular operates effectively. For example, clutch setting of the driver drill 1 may be changed electrically by a clutch ring attached to the distal end of the second casing 4B. The clutch setting is electrically changed by a ring component. In the vibration driver drill, the ring component may break during a vibration operation.

In the present embodiment, a button, or the hand switch 17, is used to change the clutch setting and is less likely to break. More specifically, unlike unintended shakes in screwing or impact actions with an impact driver, the vibration driver drill vibrates many times in short cycles. The component used for electrically changing the clutch setting in the present embodiment is less likely to break when in use.

As described above, the driver drill 1 according to the embodiment includes the motor 6, the output unit 8 located frontward from the motor 6 and rotatable with a rotational force from the motor 6, the trigger lever 10 operable to activate the motor 6, the forward-reverse switch lever 11 operable to change the rotation direction of the motor 6, the dial 16 as the first operation member operable to change the drive conditions of the motor 6, the hand switch 17 as the second operation member located upward from the dial 16 and operable to change the drive conditions of the motor 6, and the controller 18 that sets the drive conditions of the motor 6 in response to an operation on at least one of the dial 16 or the hand switch 17.

The above structure includes the hand switch 17 in addition to the dial 16. The hand switch 17 is located upward from the dial 16. The operator can change the drive conditions of the motor 6 smoothly by operating the hand switch 17, while remaining in a working posture for using the driver drill 1.

The driver drill 1 according to the embodiment includes the housing 2 including the motor compartment 21 accommodating the motor 6, the grip 22 extending downward from the motor compartment 21, and the battery holder 23 below the grip 22. The dial 16 is located on the battery holder 23, and the hand switch 17 is located on the grip 22 or the motor compartment 21.

Thus, the operator holding the grip 22 with a hand can change the drive conditions of the motor 6 smoothly by operating the hand switch 17, while remaining in a working posture for using the driver drill 1.

The trigger lever 10 in the embodiment is located in the front portion of the grip 22. The hand switch 17 is located above the trigger lever 10.

Thus, the operator holding the grip 22 with the right hand can, for example, operate the hand switch 17 with the right index finger or another finger, while remaining in a working posture for using the driver drill 1. In other words, the operator can change the drive conditions of the motor 6 with one hand, while remaining in a working posture for using the driver drill 1.

The controller 18 in the embodiment stops the motor 6 in response to a torque value applied to the motor 6 in driving the motor 6 exceeding a torque threshold. The drive conditions include the torque threshold.

An operation on the hand switch 17 while the driver drill 1 is set to the clutch mode changes the torque threshold.

The hand switch 17 in the embodiment includes a push switch. A single push on the hand switch 17 changes the torque threshold by a predetermined value.

The operator can change the torque threshold by the predetermined value by pushing the hand switch 17, or the push switch. A single push changes the torque threshold to the next value, for example, as the predetermined value.

In the embodiment, pushing the hand switch 17 with the forward-reverse switch lever 11 in the first operational state increases the torque threshold, and pushing the hand switch 17 with the forward-reverse switch lever 11 in the second operational state decreases the torque threshold.

The operational states of the forward-reverse switch lever 11 and the hand switch 17 are combined to increase or decrease the torque threshold.

The forward-reverse switch lever 11 and the hand switch 17 in the embodiment are at least partially located at the same height.

Thus, the operator can operate the forward-reverse switch lever 11 and the hand switch 17, for example, by one hand.

In the embodiment, the dial 16 and the hand switch 17 are operable in different directions.

Thus, the operator can control the drive conditions of the motor 6 by operating the operation member, the dial 16 or the hand switch 17, that is easier to use in a work situation. The operator can use the hand switch 17 to change the torque threshold, for example, in a work situation in which the dial 16 is difficult to operate. The operator can use the dial 16 to change the torque threshold, for example, in a work situation in which the hand switch 17 is difficult to operate.

The dial 16 in the embodiment is rotatable by 360° or greater.

Thus, the operator can easily change the drive conditions of the motor 6.

The driver drill 1 according to the embodiment includes the display 25. The controller 18 causes the display 25 to display the drive conditions of the motor 6.

Thus, the operator can identify the drive conditions of the motor 6 by viewing the display 25.

Other Embodiments

As shown in FIG. 8, the driver drill 1 includes the acceleration sensor 56. The acceleration sensor 56 detects the acceleration acting on, for example, the housing 2. The controller 18 stops the motor 6 in response to the acceleration sensor 56 detecting a value greater than an acceleration threshold. The drive conditions include the acceleration threshold. The acceleration threshold may be changed with an operation on the hand switch 17.

In the screwing operation with the driver drill 1, the driver drill 1 may receive an excessive reaction force and may move greatly against a force from the operator. The acceleration sensor 56 detects the movement of the driver drill 1. In response to a determination that the acceleration acting on the driver drill 1 exceeds the acceleration threshold based on the detection data from the acceleration sensor 56, the controller 18 stops the motor 6.

The operator can use the hand switch 17 to adjust the acceleration threshold in accordance with, for example, a work situation.

Figure 10:
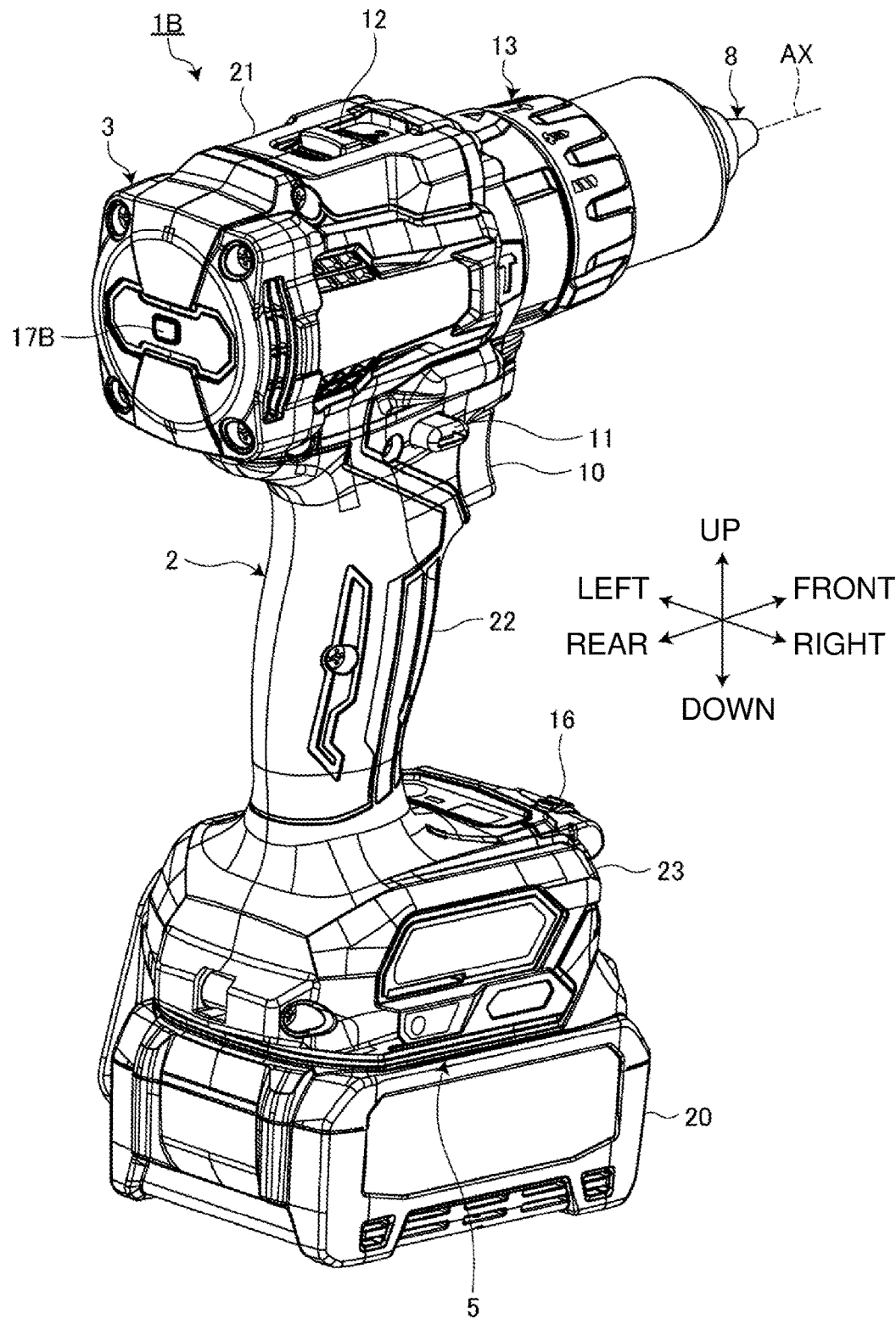
FIG. 10 is a rear perspective view of a driver drill according to a modification.

FIG. 10 is a rear perspective view of a driver drill 1B according to a modification. A hand switch 17B is located upward from the dial 16. In the example shown in FIG. 10, the hand switch 17B is located on the rear surface of the rear cover 3.

In the example shown in FIG. 10 as well, the operator holding the grip 22 with a hand can change the drive conditions of the motor 6 smoothly by operating the hand switch 17B, while remaining in a working posture for using the driver drill 1B. The operator holding the grip 22 with the right hand can, for example, operate the hand switch 17B with the right thumb or in another manner, while remaining in a working posture for using the driver drill 1B.

As described above, the driver drill 1B, which is a vibration driver drill in the example in FIG. 10, includes the motor 6, the output unit 8 located frontward from the motor 6 and rotatable with a rotational force from the motor 6, the vibrator 40 between the motor 6 and the output unit 8 to switch the output unit 8 between vibrating in the front-rear direction and not vibrating in the front-rear direction, the trigger lever 10 operable to activate the motor 6, the forward-reverse switch lever 11 operable to change the rotation direction of the motor 6, the motor compartment 21 and the rear cover 3 as a motor housing accommodating the motor 6, the grip 22 as a grip housing extending downward from the motor housing, the hand switch 17B as an operation button on the rear cover 3, which is a part of the motor housing, and the controller 18 that sets the drive conditions of the motor 6 in response to an operation on the operation button. The hand switch 17B is operable to change the drive conditions of the motor 6.

In the above structure, the rear cover 3 that is a part of the motor housing includes the hand switch 17B that is the operation button. The operator can change the drive conditions of the motor 6 smoothly by operating the operation button, while remaining in a working posture for using the driver drill 1B.

Figure 11:
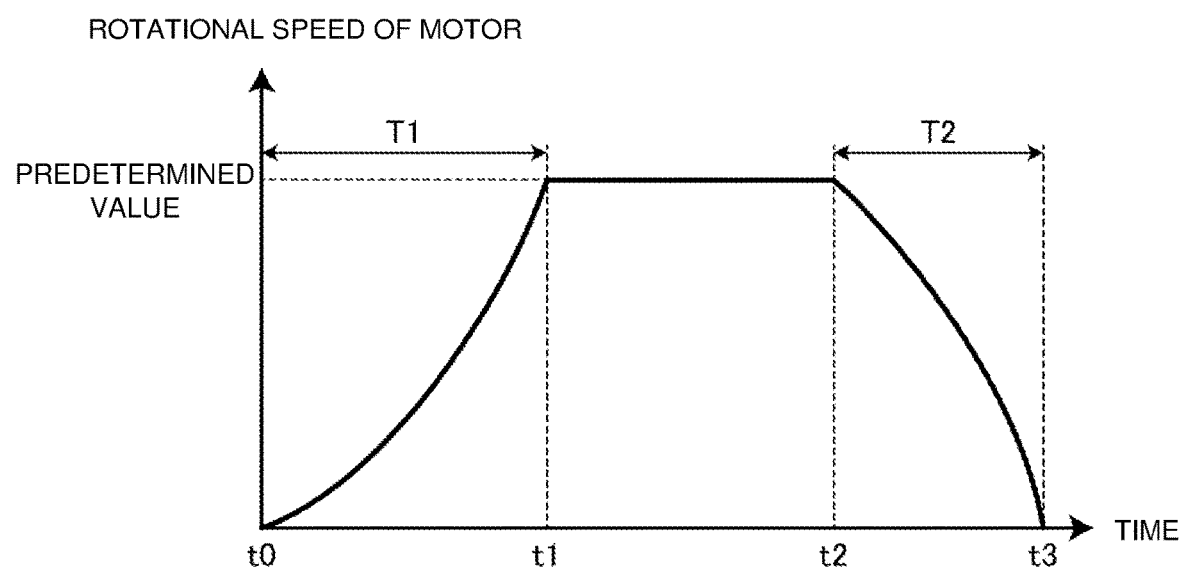
FIG. 11 is a graph describing drive conditions of a motor in the modification.

FIG. 11 is a graph describing the drive conditions of the motor 6 in the modification. The drive conditions of the motor 6 include the torque threshold in the embodiment described above. The drive conditions of the motor 6 may include the behavior of the motor 6 or the time for the rotational speed of the motor 6 to reach a predetermined value after the trigger lever 10 is operated. The drive conditions of the motor 6 may include the behavior of the motor 6 or the time for the motor 6 to stop after the torque value applied to the motor 6 exceeds the torque threshold.

In the graph in FIG. 11, the horizontal axis indicates the time elapsed after the trigger lever 10 is operated, and the vertical axis indicates the rotational speed of the motor 6. The trigger lever 10 is operated at the time point t0. The rotational speed of the motor 6 increases to a predetermined value based on the amount of operation on the trigger lever 10. At the time point t1, the rotational speed of the motor 6 reaches the predetermined value. At the time point t2, the torque value applied to the motor 6 exceeds the torque threshold, triggering an operation to stop the motor 6. At the time point t3, the motor 6 stops.

The hand switch 17 (17B) may be operated to change the time T1 for the motor 6 to reach the predetermined rotational speed after the trigger lever 10 is operated. The hand switch 17 (17B) may be operated to change the time T2 for the motor 6 to stop after the torque value applied to the motor 6 exceeds the torque threshold. The time T1 ranges from the time point t0 to the time point t1. The time T2 ranges from the time point t2 to the time point t3.

The hand switch 17 (17B) may be operated to change the behavior of the motor 6 for a period for which the rotational speed of the motor 6 reaches the predetermined value after the trigger lever 10 is operated. The hand switch 17 (17B) may be operated to change the behavior of the motor 6 for a period for which the motor 6 stops after the torque value applied to the motor 6 exceeds the torque threshold. In other words, the behavior of the motor 6 within the time T1 may be changed, and the behavior of the motor 6 within the time T2 may be changed. The behavior of the motor 6 within the time T1 is, for example, the rate of increase in the rotational speed of the motor 6. The behavior of the motor 6 within the time T2 is, for example, the rate of decrease in the rotational speed of the motor 6.

The above structure allows the operator to operate the hand switch 17 (17B) to adjust the drive conditions of the motor 6, for example, as intended by the operator.

In the above embodiments, the driver drill 1 (1B) is powered by the battery pack 20 attached to the battery mount 5. The driver drill 1 (1B) may use utility power (alternating-current power supply).

REFERENCE SIGNS LIST 1 driver drill
1B driver drill
2 housing
2L left housing
2R right housing
2S screw
3 rear cover
3S screw
4 casing
4A first casing
4B second casing
4C bracket plate
4D stop plate
4E screw
4S screw
5 battery mount
6 motor
7 power transmission
8 output unit
9 fan
10 trigger lever
11 forward-reverse switch lever
12 speed switch lever
13 mode switch ring
14 light unit
15 interface panel
16 dial (first operation member)

16A cam projection
16B projection
16C ridge
16L recess
16R recess
16T protrusion
17 hand switch (second operation member)
17B hand switch
18 controller
19A inlet
19B outlet
20 battery pack
21 motor compartment
22 grip
23 battery holder
24 operation unit
25 display
26 controller case
27 panel opening
28 dial opening
30 reducer
31 first planetary gear assembly
31C first carrier
31P planetary gear
31R internal gear
31S pinion gear
32 second planetary gear assembly
32C second carrier
32P planetary gear
32R internal gear
32S sun gear
33 third planetary gear assembly
33C third carrier
33P planetary gear
33R internal gear
33S sun gear
34 speed switch ring
34M permanent magnet
34T protrusion
35 connection ring
36 coil spring
40 vibrator
41 first cam
42 second cam
43 vibration switch ring
43S opposing portion
43T projection
44 stop ring
45 support ring
46 steel ball
47 washer
48 cam ring
49 mode detection ring
49M permanent magnet
51 trigger signal generator
52 forward-reverse sensor
53 speed sensor
54 mode sensor
55 dial sensor
56 acceleration sensor
61 stator
61A stator core
61B front insulator
61C rear insulator
61D coil
61E sensor circuit board
61F fusing terminal
61G short-circuiting member
62 rotor
62A rotor core
62B permanent magnet
63 rotor shaft
64 bearing
65 bearing
70 tip tool
81 spindle
81F flange
82 chuck
83 bearing
84 bearing
85 lock cam
86 lock ring
87 coil spring
161 rod
162 permanent magnet
163 cam
163A cam projection
163T protrusion
164 coil spring
165 central recess
166 left recess
167 right recess
168 groove
169 cover
AX rotation axis
DX dial axis

What is claimed is:

1. A driver drill, comprising:
a motor;
a motor compartment housing the motor;
an output unit in front of the motor and rotatable with a rotational force from the motor;
a grip extending downward from the motor compartment;
a trigger lever (i) operable to activate the motor and (ii) on the grip;
a battery holder below the grip;
a forward-reverse switch lever (i) operable to change a rotation direction of the motor and (ii) on an upper portion of the grip;
a dial operable to change a torque threshold for the motor;
a push switch (i) above the dial, (ii) being operable to change the torque threshold, and (iii) on the motor compartment; and
a controller configured to stop the motor when a torque of the motor exceeds the torque threshold.

2. The driver drill according to claim 1, wherein
the controller is configured to control a time for the motor to stop after the torque of the motor exceeds the torque threshold.

3. The driver drill according to claim 1, wherein
the push switch and the controller are configured such that a single push on the push switch changes the torque threshold by a predetermined value.

4. The driver drill according to claim 3, wherein the push switch, the controller and the forward-reverse switch are configured such that
pushing the push switch with the forward-reverse switch lever in a first operational state increases the torque threshold, and
pushing the push switch with the forward-reverse switch lever in a second operational state decreases the torque threshold.

5. The driver drill according to claim 4, wherein the forward-reverse switch lever and the push switch are at least partially at a same height.

6. The driver drill according to claim 1, wherein the dial and the push switch are operable in different directions.

7. The driver drill according to claim 1, wherein the dial is rotatable by 360° or greater.

8. The driver drill according to claim 1, further comprising:
a display,
wherein the controller is configured to cause the display to display a drive condition of the motor.

9. The driver drill according to claim 1, wherein the controller is configured to control behavior of the motor or time for a rotational speed of the motor to reach a predetermined value after the trigger lever is operated.

10. The driver drill according to claim 1, further comprising:
an acceleration sensor,
wherein the controller stops the motor in response to the acceleration sensor detecting a value greater than an acceleration threshold.

* * * * *